United States Patent
Mukherjee et al.

(10) Patent No.: US 11,988,190 B2
(45) Date of Patent: May 21, 2024

(54) METHOD FOR PRODUCING A WIND TURBINE BLADE AND WIND TURBINE BLADE

(71) Applicants: BLADE DYNAMICS LIMITED, Hampshire (GB); LM WIND POWER A/S, Kolding (DK)

(72) Inventors: Manish Mukherjee, Hampshire (GB); Michael Lund-Laverick, Kolding (DK)

(73) Assignees: BLADE DYNAMICS LIMITED, Eastleigh Hampshire (GB); LM WIND POWER A/S, Kolding (DK)

( * ) Notice: Subject to any disclaimer, the term of this patent is extended or adjusted under 35 U.S.C. 154(b) by 208 days.

(21) Appl. No.: 17/606,425

(22) PCT Filed: Apr. 24, 2020

(86) PCT No.: PCT/EP2020/061498
§ 371 (c)(1),
(2) Date: Oct. 25, 2021

(87) PCT Pub. No.: WO2020/216924
PCT Pub. Date: Oct. 29, 2020

(65) Prior Publication Data
US 2022/0307465 A1 Sep. 29, 2022

(30) Foreign Application Priority Data

Apr. 26, 2019 (GB) ..................................... 1905845

(51) Int. Cl.
*F03D 1/06* (2006.01)
*B29D 99/00* (2010.01)
*B29L 31/08* (2006.01)

(52) U.S. Cl.
CPC ....... *F03D 1/0675* (2013.01); *B29D 99/0028* (2013.01); *F03D 1/0641* (2013.01);
(Continued)

(58) Field of Classification Search
CPC . F03D 1/0641; F03D 1/0675; B29D 99/0028; B29L 2031/085; F05B 2230/60;
(Continued)

(56) References Cited

U.S. PATENT DOCUMENTS

| 8,419,373 | B1 | 4/2013 | Fukami |
| 10,180,125 | B2 | 1/2019 | Carroll et al. |

(Continued)

FOREIGN PATENT DOCUMENTS

| CN | 201714589 U | 1/2011 |
| CN | 201805143 U | 4/2011 |

(Continued)

OTHER PUBLICATIONS

Search Report dated Oct. 17, 2019 issued in corresponding Great Britain Application No. 1905845.2.

(Continued)

*Primary Examiner* — Audrey B. Walter
(74) *Attorney, Agent, or Firm* — Nath, Goldberg & Meyer; Jerald L. Meyer; Tanya E. Harkins

(57) ABSTRACT

Disclosed is a wind turbine blade and a method for its manufacture. A lower shell part and an upper shell part are provided, each shell part having a leading edge end and a trailing edge end. A flatback profile component and web for connecting an inner surface of the lower side shell part with an inner surface of the upper side shell part are connected. The assembly which comprises the flatback profile component and the at least one web are placed on the lower shell part and the upper shell part is mounted. The wind turbine blade comprises a flatback profile component being arranged at the trailing edge, wherein the flatback profile component is coupled by at least one distance holder with at least one web, wherein the web couples the interior surface of the upwind side shell part with the interior surface of the downwind side shell part.

16 Claims, 6 Drawing Sheets

(52) U.S. Cl.
CPC ..... *B29L 2031/085* (2013.01); *F05B 2230/60* (2013.01); *F05B 2240/301* (2013.01); *F05B 2240/304* (2020.08); *F05B 2260/301* (2013.01)

(58) Field of Classification Search
CPC .......... F05B 2240/301; F05B 2240/304; F05B 2260/301
See application file for complete search history.

(56) References Cited

U.S. PATENT DOCUMENTS

| | | | |
|---|---|---|---|
| 2010/0143146 A1* | 6/2010 | Bell | .......................... F03D 1/06 416/233 |
| 2011/0211970 A1 | 9/2011 | Nies | |
| 2013/0094970 A1 | 4/2013 | Fukami | |
| 2018/0142670 A1* | 5/2018 | Garm | .................... F03D 1/0633 |
| 2020/0318605 A1* | 10/2020 | Burchardt | ............... F03D 80/30 |

FOREIGN PATENT DOCUMENTS

| | | | | |
|---|---|---|---|---|
| EP | 2204577 A2 | 7/2010 | | |
| EP | 2341241 A1 | 7/2011 | | |
| EP | 2742234 B1 | 1/2018 | | |
| KR | 10-1466076 B1 | 11/2014 | | |
| WO | WO-2018015250 A1 * | 1/2018 | ............. | B29C 70/42 |

OTHER PUBLICATIONS

Search Report dated Jul. 13, 2020 issued in corresponding International Application No. PCT/EP2020/061498.

* cited by examiner

METHOD FOR PRODUCING A WIND TURBINE BLADE AND WIND TURBINE BLADE

This is a National Phase Application filed under 35 U.S.C. 371 as a national stage of PCT/EP2020/061498, filed Apr. 24, 2020, an application claiming the benefit of Great Britain Application No. 1905845.2, filed Apr. 26, 2019, the content of each of which is hereby incorporated by reference in its entirety.

The present invention relates to a method for manufacturing a wind turbine blade and to a wind turbine blade. The wind turbine blade comprises an upwind side part and a downwind side part which are bonded along at least one joint. The profile of the wind turbine blade is embodied as a flatback profile.

BACKGROUND

As wind turbines and wind turbine blades increase in size, the blade loads, i.e. strains, bending moments, peel loads etc., in particular along the trailing edge, increase. For this and other reasons, the design of the trailing edge is an important factor for the efficiency of the wind turbine.

For producing a wind turbine blade, an upwind side shell part and a downwind side shell part are assembled and bonded with an adhesive.

Wind turbine blades comprising a flatback profile at the trailing edge may have an increased efficiency. An optimized profile comprises a varying geometry of the trailing edge along the airfoil region of the blade.

For providing such a flatback profile, a flatback web may be provided as a separate component which is bonded to the shell parts.

Document EP 2 341 241 A1 shows such a flatback profile, which is embodied as a prefabricated panel. With such a prefabricated panel, it is possible to achieve a geometry having optimized aerodynamic properties. In particular, a flatted trailing edge with sharp corners can be provided.

In further, the structure between the blade shell parts may be reinforced by webs, which extend in a longitudinal direction to bridge the gap between one blade shell part and the other one. Such webs may embodied as profiles and extent through the cavity between the shell parts in order to achieve an increased strength, in particular an increased shear strength.

Document EP 2 742 234 B1 shows a wind turbine blade, wherein shear webs between the blade shell parts are interconnected by cross-connections.

However, it may be complicated to assemble a wind turbine blade with webs inside its structure, and a flatback web which forms the trailing edge.

In particular, it may be challenging to bond inner webs and flatback web with the upwind or downwind blade shell part and to close a mould for bonding the shell parts in few steps and without having the risk that components become misaligned.

SUMMARY

It is an object of the present invention to provide an improved method of manufacturing a flatback wind turbine blade, wherein assembling of the flatback wind turbine blade is facilitated.

It is another object of the present invention to provide a wind turbine blade having a flatback profile which sustains high loads, and wherein the components, in particular the webs between the shell parts, are aligned with a high accuracy.

The object of the invention is achieved by a method of producing a wind turbine blade according to one or more of the claims presented herein.

Preferred embodiments of the invention are subject matter of the dependent claims, the description and the drawings.

The invention relates to a method of manufacturing a wind turbine blade, which comprises a flatback profile at its trailing edge, said method comprising:
- providing a lower shell part and an upper shell part, each shell part having a leading edge end and a trailing edge end,
- providing a flatback profile component,
- providing at least one web, preferably a shear web, for connecting an inner surface of the lower side shell part with an inner surface of the upper side shell part,
- connecting the flatback profile component with the at least one web,
- placing the assembly which comprises the flatback profile component and the at least one web on the lower shell part,
- mounting the upper shell part.

According to the invention, a flatback assembly is provided, which comprises a flatback component as well as at least one web which connects the interior surfaces of the blade shell parts.

The flatback profile component forms the trailing edge of the wind turbine blade and may be connected with at least one web preferably before the assembly of the flatback profile component and the at least one web is lifted into the lower blade shell part.

Hence, the flatback profile component can be produced separately and can be assembled together with the at least one web. In a preferred embodiment, the flatback assembly of the present invention comprises a flatback profile component rigidly connect with a shear web. It is preferred that the rigid connection is provided by one or more rigid distance elements, such as bolts, which are arranged between the flatback profile component and the shear web such that a predefined distance is provided between the flatback profile component and the shear web.

The lower and upper shell parts of the present invention will typically be lower and upper shell halfs. The one or more shear webs are preferably I-shaped shear webs. In other embodiments, the shear webs are C-shaped shear webs. Typically, an I-shaped shear web will comprise a web body and a first web foot flange at a first end of the web body and a second web foot flange at a second end of the web body.

The flatback assembly comprising the flatback profile component and the at least one web may be lifted into the lower blade shell part, when the lower shell part is arranged in a mould, and the mould is closed for bonding the upper shell part with the lower shell part.

In a preferred embodiment, the flatback profile component comprises a panel which is to be bonded with the blade shell parts to form at least part of the trailing edge of the blade.

In particular, the entire flatback assembly can be lifted into the lower blade shell part, when the lower blade shell part is arranged in a mould, which can be closed to combine the blade shell parts. Since web and flatback profile component are connected to each other, the interior structural components of the wind turbine blade are aligned to each other and can be inserted as one single assembly.

Such a blade manufacturing process is faster and less complex. In particular, the mould is used for a shorter time. Therefore, the invention provides for an economically improved production.

The separate flatback profile component may also reduce the complexity of the laminate of the blade shell parts.

It should be understood that the "lower" shell part in the sense of the invention can be embodied as the upwind side shell part as well as the downwind side shell part.

Preferably, an adhesive is applied on the flanks of the flatback profile component and the flatback profile component is bonded to the trailing edge ends of the lower and upper blade shell parts.

According to an embodiment of the invention, the at least one web is connected with a least one further web, preferably a further shear web. In particular, an assembly, which is placed in the lower blade shell part, is provided with a trailing edge web and with a leading edge web. The trailing edge web is positioned next to the trailing edge of the wind turbine blade and the leading edge web is positioned next to the leading edge of the wind turbine blade.

The at least one web may be connected with the flatback profile component and/or a further web by using distance holders.

For example, bolts, in particular plastic bolts, can be used as distance holders. E.g. a polyamide can be used as a material for the bolts. The bolts are used to connect the trailing edge component with the at least one web and to ensure a defined distance and a defined alignment of the flatback profile component and the web in relation to each other.

Preferably, the flatback profile component is connected with the at least one web by using at least two bolts, wherein the bolts are arranged above each other. E.g. two rows of bolts can be used to connect the flatback profile component with the web in order to avoid a distortion of the alignment of the web and the flatback profile component.

Preferably, a flatback profile component is provided which has a varying geometry over its length. Since the flatback profile component may be produced as a separate component, it can be embodied in any three-dimensional shape, having optimized aerodynamic properties.

In particular, a flatback profile component is provided, wherein the outer edges/corners of the flatback profile component are tailored to maximize aerodynamic efficiency, e.g. by having a sharp upwind side trailing edge corner and a rounded downwind side trailing edge corner. The desired shape can be easily achieved by providing a mould for the flatback profile component, with the mould being provided with a tailor-made inner form corresponding to the desired profile of the flatback profile component.

According to an embodiment of the invention, a flatback profile component with angled flanks is provided, which are bonded with the outer surfaces of the trailing edge of the blade shell parts.

According to an embodiment of the invention, an adhesive may be applied between the surfaces of the at least one web and the adjacent inner surfaces of the blade shell parts, and also between the flanks of the flatback profile component and the outer edge regions of the blade shell parts. When closing the mould for the blade, all components of the blade are bonded simultaneously. This helps to release the mould for subsequent blade shell manufacturing in order to maximize the production volume and to reduce the tooling costs per unit.

In another aspect, the present invention relates to a wind turbine blade obtainable by the above-described methods.

The invention further relates to a wind turbine blade, in particular to a wind turbine blade being manufactured with a method as describe above.

According to the invention, the wind turbine blade comprises:
an upwind side shell part,
a downwind side shell part,
a leading edge and a trailing edge,
a flatback profile component being arranged at the trailing edge, wherein the flatback profile component is coupled by at least one distance holder with at least one web, wherein the web couples the interior surface of the upwind side shell part with the interior surface of the downwind side shell part.

A wind turbine blade typically comprises a root region, an airfoil region with a tip, a pressure side, a suction side and a chord line extending between a leading edge and a trailing edge.

Each shell part typically comprises a core, e.g. a polymer foam, which is laminated with glass and/or carbon fibre layers which are embedded in a polymer resin. The core may not extend through the entire length of the wind turbine blade, in particular, a tip end region may only comprise a fibre-reinforced laminate.

The blade shell parts form a cavity, wherein the at least one web is arranged in this cavity in order to connect the blade shell parts and to provide a structure with an increased shear resistance.

The upwind side shell part is typically an upwind side shell half. The downwind side shell part is typically a downwind side shell half.

Each of the upwind side shell part and the downwind side shell part comprises a leading-edge end and a trailing-edge end, wherein usually the respective leading-edge ends are joined at the leading edge of the blade and the respective trailing-edge ends are joined at the trailing edge or the blade, the latter for example involving the use of the flatback profile component.

As seen in the spanwise direction of the blade, the flatback web will usually extend from the root end, or from close to the root such as not further than 5 meters from root end in the spanwise direction, up to 40 meters, such as up to 30 meters. Thus, the flatback web preferably has a length of 5 to 50 meters, more preferably, 10 to 40 meters, most preferably 15 to 35 meters.

Since the flatback profile component is coupled with the web by at least one distance holder, the invention allows achieving an exact alignment between the components. In further, the web and the flatback profile component can be bonded with the shell parts simultaneously. This facilitates the production of the wind turbine blade.

In particular, a side face of the web can be connected with the flatback web component by bolts, in particular by plastic bolts.

According to an embodiment of the invention, the wind turbine blade comprises a first web being arranged in a trailing edge region and a second web being arranged in a leading edge region, wherein the first web is coupled by the at least one distance holder with the flatback profile component, and wherein the first web is coupled with the second web by at least one further distance holder.

The at least one web may be embodied as an I-shaped shear web, a C-shaped shear web, or as a H-beam profile, wherein the H-beam profile is bonded by an adhesive to the interior surfaces of the blade shell parts.

The flatback profile component may comprise one or more layers of a fibre material infused with a resin, such as a fibre reinforced laminate. According to one embodiment of the invention, the flatback profile component can be used as a load bearing structure of the blade.

According to another embodiment of the invention, the flatback profile component may be used only as a panel for optimizing the aerodynamic properties.

The invention further relates to a wind turbine, which comprises wind turbine blades as described above.

In another aspect, the present invention relates to a flatback assembly for use in a wind turbine blade, the flatback assembly comprising a flatback profile component and at least one web, such as at least one shear web, wherein the flatback profile component is connected with the at least one web to form the flatback assembly.

Embodiments and examples described herein with respect to the method or the wind turbine blade of the present invention likewise apply to, or may be combined with, any embodiments described herein with respect to the flatback assembly, and vice versa.

BRIEF DESCRIPTION OF THE FIGURES

Embodiments of the disclosure of the invention will be described in more detail in the following with regard to the accompanying figures. The figures show one way of Implementing the present invention and are not to be construed as being limiting to other possible embodiments falling within the scope of the attached claim set.

DETAILED DESCRIPTION

Figure 1:
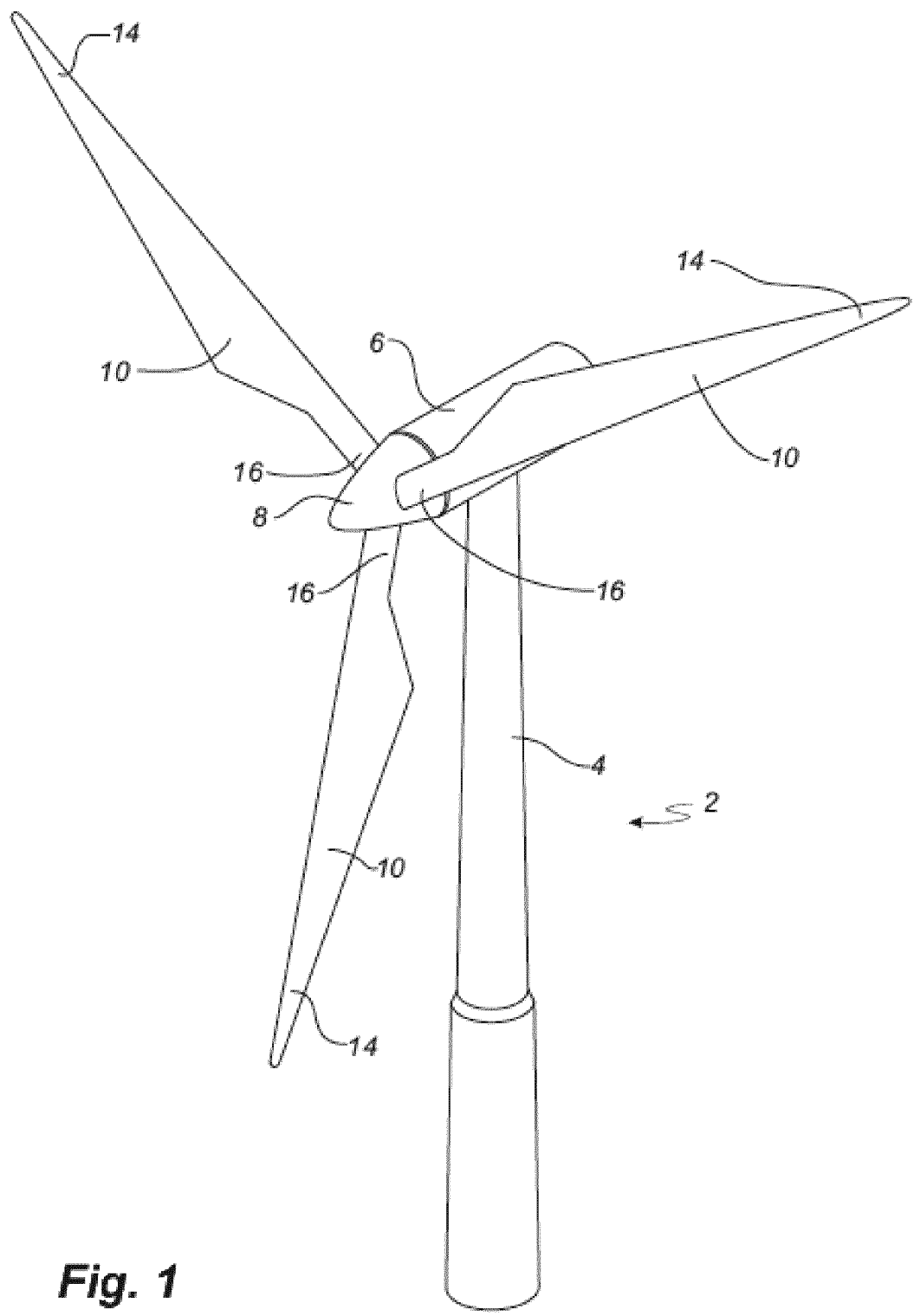
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
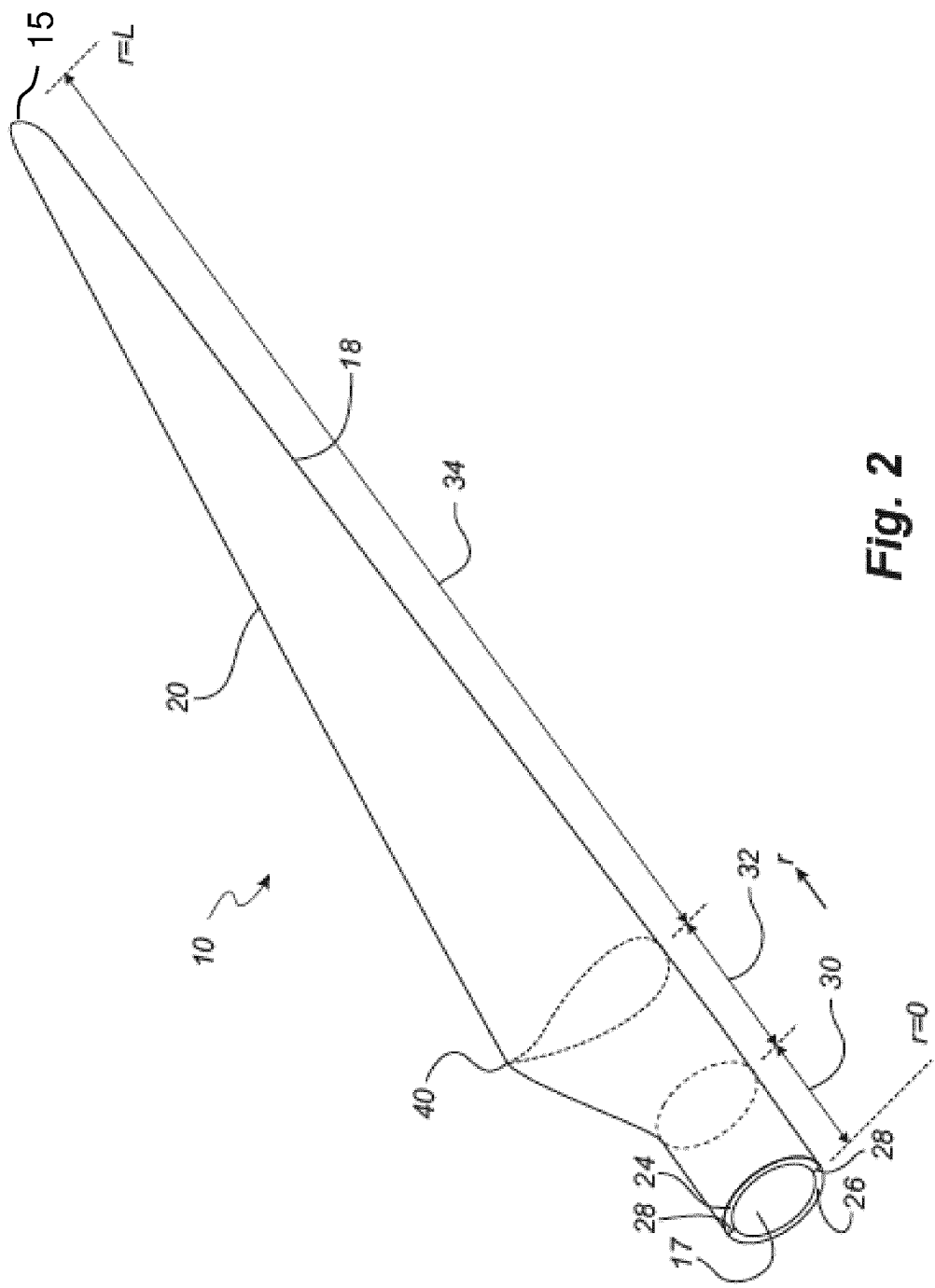
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 have a semi-circular or semi-oval outer cross-sectional shape.

The trailing edge 20 may be embodied as a flatback trailing edge, wherein the edge is flattened in order to achieve better aerodynamic properties. This construction increases the efficiency of the wind turbine blade in comparison with a sharp edge design.

Figure 3:
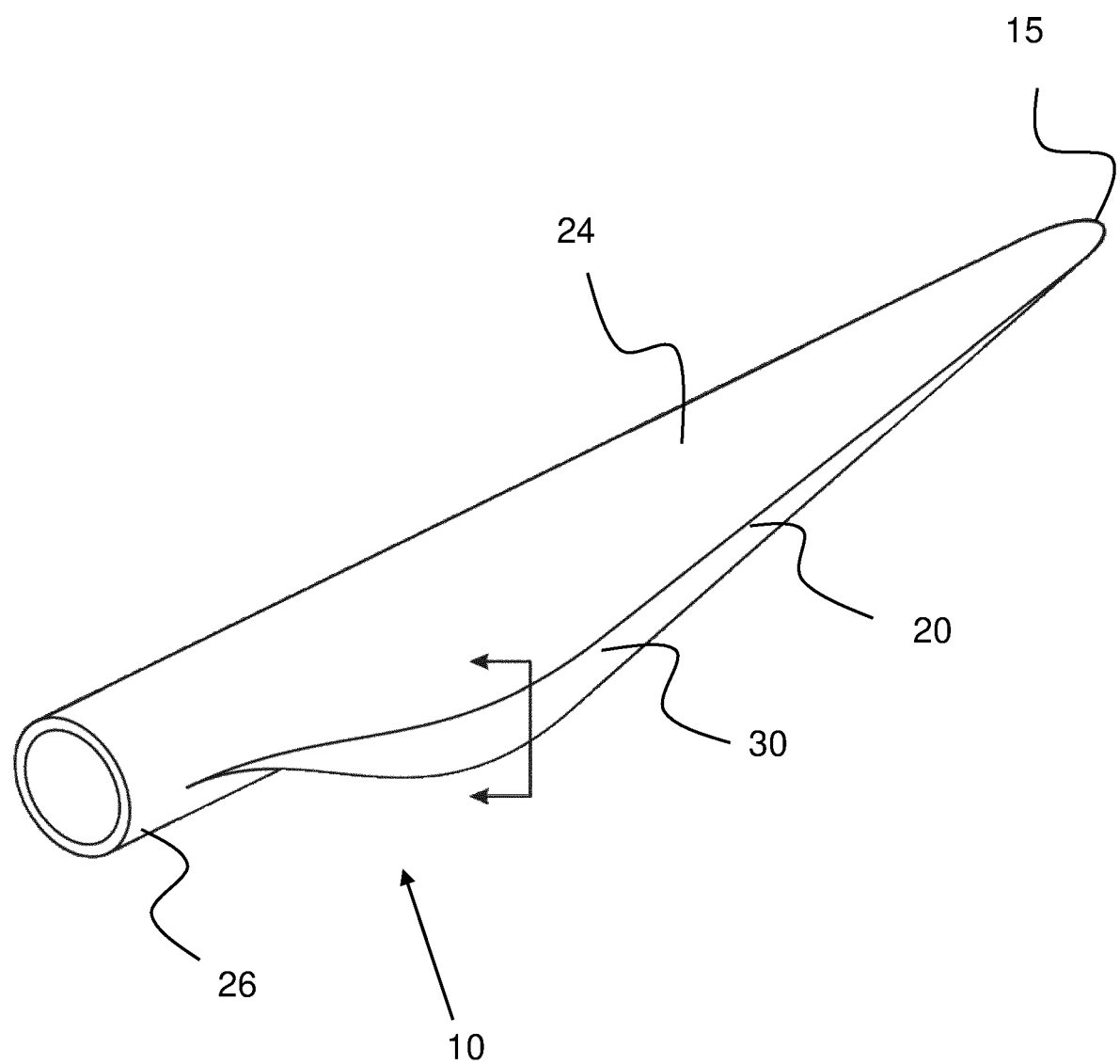
FIG. 3 shows a wind turbine blade with a flatback profile at the trailing edge in more detail.

FIG. 3 shows a wind turbine blade 10 with a flatback profile at the trailing edge in more detail. The trailing edge 20 has a flattened profile. The flattened profile increases the aerodynamic efficiency and also helps to reduce the chord width.

The flatback profile Is provided by a flatback profile component 30 which connects the upwind side shell part 24 to the downwind side shell part 26. Details of this flatback profile component 30 and the method for manufacturing the wind turbine blade 10 will be explained in more detail with reference to the following drawings.

Figure 4:
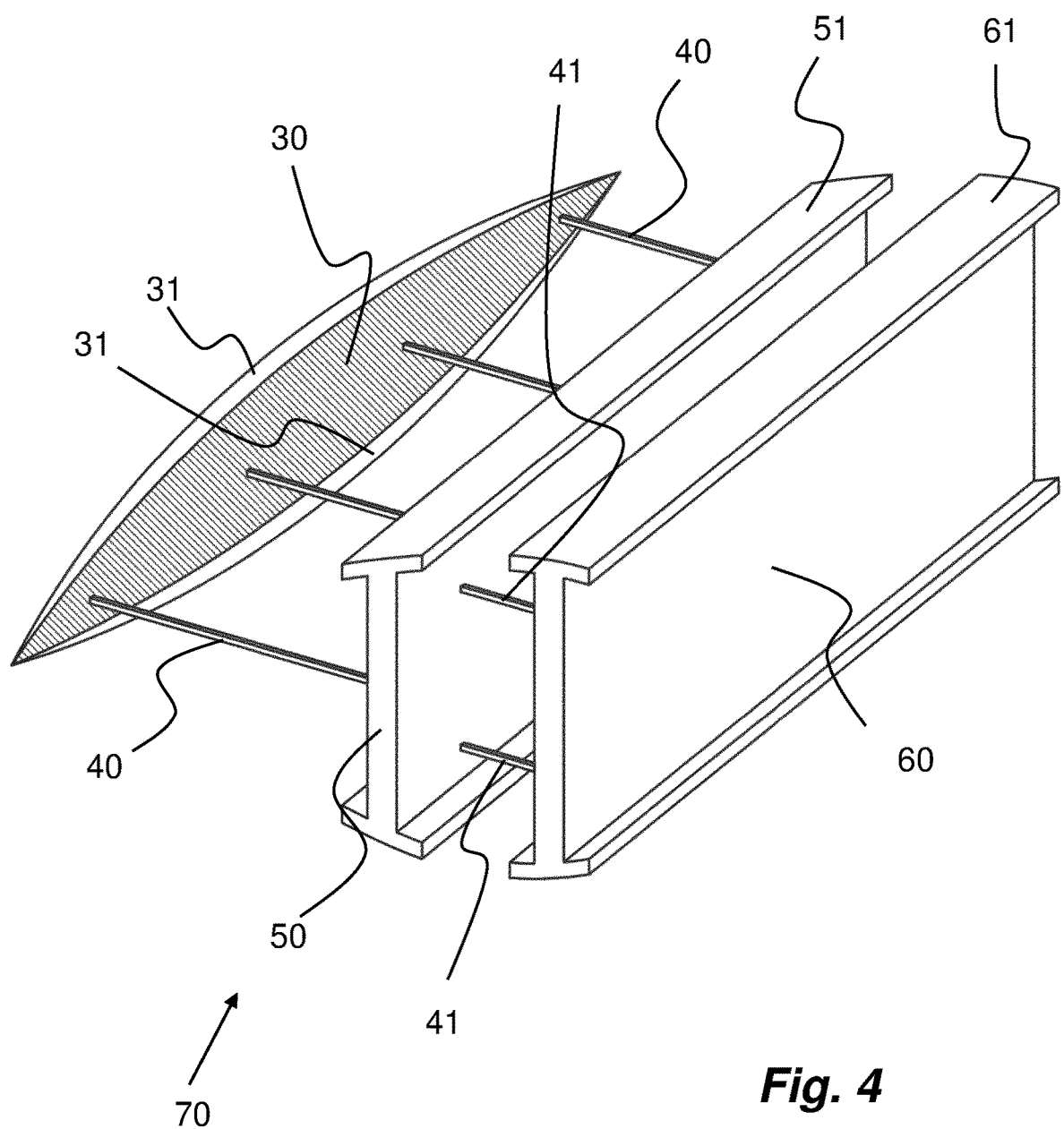
FIG. 4 is a schematic view of an assembly with a flatback profile component and shear webs, which is used for manufacturing the wind turbine blade.

FIG. 4 is a schematic view of an assembly 70 with a flatback profile component and shear webs, which is used for manufacturing the wind turbine blade.

The flatback profile component 30, which is to be bonded with the blade shell parts is connected with at least one web 50 by plastic bolts 40, which are arranged between a side face of the web 50 and the flatback profile component 30.

According to this embodiment of the invention, the web 50 is connected by plastic bolts 41 with a second web 60.

The webs 50, 60 are embodied as shear webs, which extend along a longitudinal length of the wind turbine blade.

The flatback profile component 30 is embodied as a panel which is to be bonded with the blade shell parts to form at least part of the trailing edge of the blade.

In order to manufacture the wind turbine blade, adhesive may be applied on the flanks 31 of the flatback profile component 30 and on the lower and upper surfaces 51, 61 of the webs 50, 60. The entire assembly 70 may be positioned in a lower blade shell, and the manufacturing of the wind turbine blade may be finished by closing a mould in order to combine upper and lower blade shell part.

Figure 5:
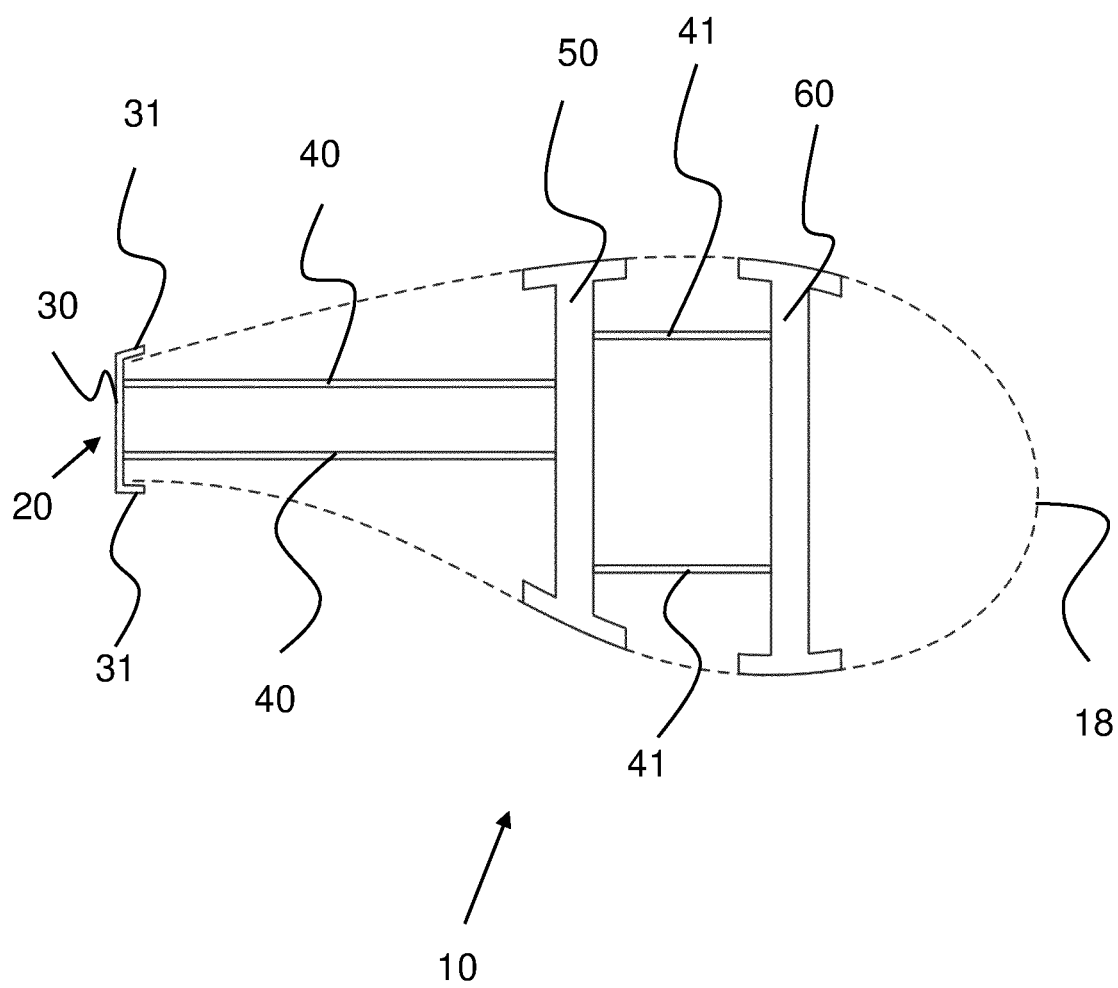
FIG. 5 is a schematic illustration, how the assembly with the flatback profile component and the shear webs are arranged in the wind turbine blade.

FIG. 5 is a schematic illustration of how the assembly with the flatback profile component 30 and the shear webs 50, 60 is arranged in the wind turbine blade 10.

The web 60 is embodied as a leading edge shear web, which is arranged next to the leading edge 18 of the wind turbine blade.

The web 50 serves as a trailing edge shear web, which is arranged next to the trailing edge 20, which is embodied as a flatback trailing edge being provided by the flatback profile component 30.

The flatback profile component 30 is connected to the web 50 by bolts 40, and the web 50 is connected to the second web 60 by bolts 41. Preferably, at least two rows of bolts 40 and two rows of bolts 41 are arranged in a stacked manner in order to prevent a distortion of the components.

The bolts 40, 41 may the bonded with an adhesive to the side face of the web 50, 60 or the flatback profile component 30, respectively. The bolts 40, 41 may also be inserted into blind holes or through holds provided in the web 50, 60 and/or in the flatback profile component 30.

The flatback profile component 30 is embodied as a panel with a varying geometry over its length, and comprises, at least sectionwise, angled flanks 31, which are bonded to the exterior surfaces of the blade shell parts.

Figure 6:
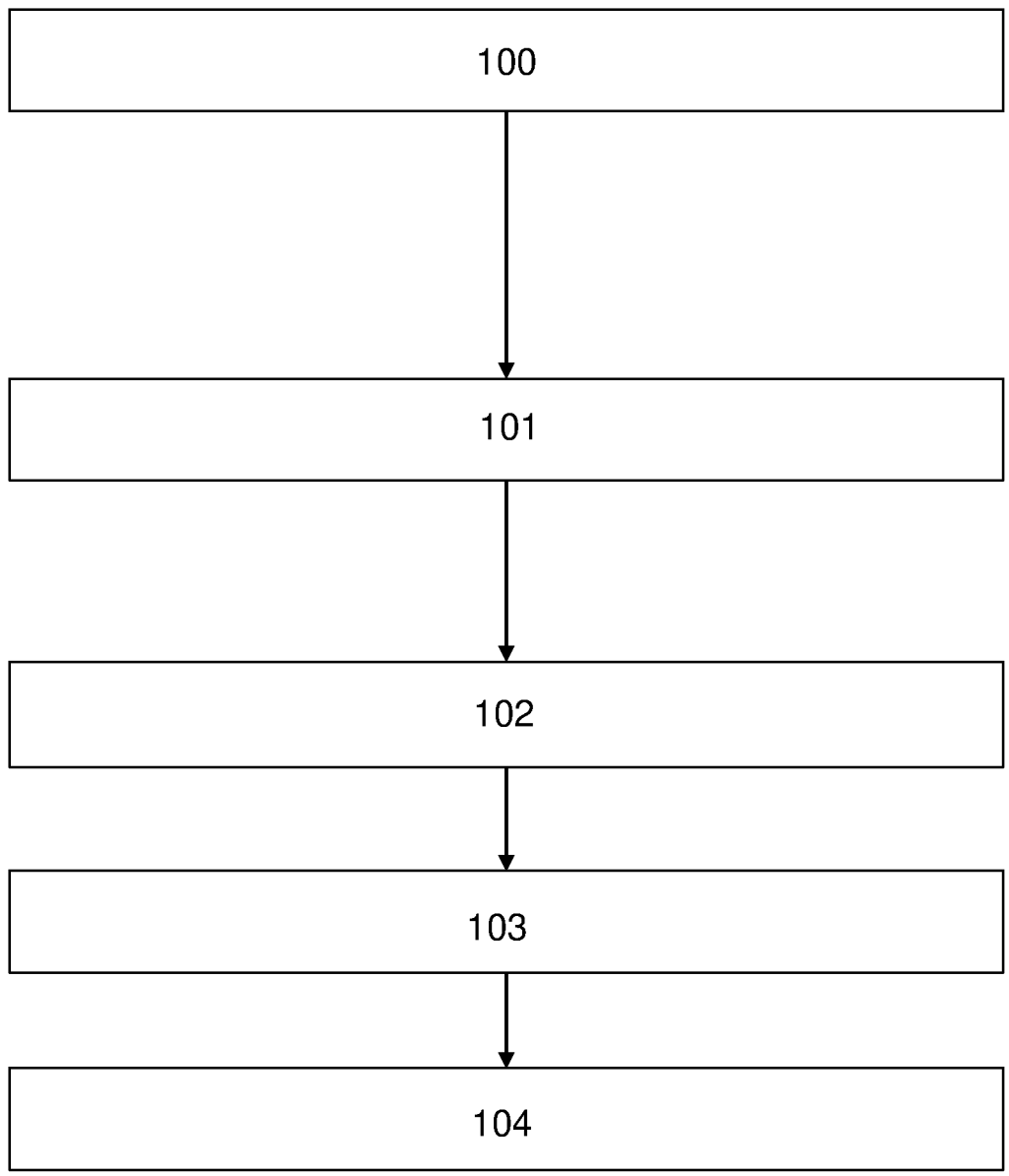
FIG. 6 is flowchart of an exemplary method for manufacturing a wind turbine blade.

FIG. 6 is a flowchart showing the steps of producing a wind turbine blade according to an embodiment of the invention.

A lower shell part and an upper shell part are produced, each shell part having a leading edge end and a trailing edge end 100.

A flatback profile component and at least one web for connecting an inner surface of the lower side shell part with an inner surface of the upper side shell part are manufactured separately 101, and the flatback profile component is connected with the at least one web 102.

This assembly, which comprises the flatback profile component and the at least one web, is lifted into a lower shell part (e.g. Into the upwind side shell part), when the lower shell part is arranged in a mould 103.

Finally, the mould for combining the blade shell parts is closed 104.

Due to the fact that the entire assembly with webs 50, 60 and flatback profile component 30 can be assembled offline and lifted as one component into the lower shell part, the manufacturing of the wind turbine blade is faster and easier to perform with a high accuracy.

The invention has been described with reference to preferred embodiments. However, the scope of the invention is not limited to the Illustrated embodiments, and alterations and modifications can be carried out without deviating from the scope of the invention.

LIST OF REFERENCES 2 wind turbine
4 tower
6 nacelle
8 hub
10 blade
11 groove
14 blade tip
15 tip end
16 blade root
17 root end
18 leading edge
20 trailing edge
24 first/lower blade shell part (upwind/pressure side shell part)
26 second/upper blade shell part (downwind/suction side part)
30 flatback profile component
31 flank
40 bolt
41 bolt
50 web (trailing side)
51 surface
60 web (leading side)
61 surface
70 assembly of flatback profile component and web
100 providing a lower shell part and an upper shell part, each shell part having a leading edge end and a trailing edge end
101 providing a flatback profile component and at least one web for connecting an Inner surface of the lower side shell part with an Inner surface of the upper side shell part
102 connecting the flatback profile component with the at least one web
103 lifting the assembly, which comprises the flatback profile component and the at least one web into the lower shell part, wherein the lower shell part is arranged in a mould
104 closing the mould in order to combine the shell parts

The invention claimed is:

1. A method of manufacturing a wind turbine blade, which comprises a flatback profile at a trailing edge of the wind turbine blade, said method comprising:
   providing a lower shell part and an upper shell part, each of the lower and upper shell parts having a leading edge end and a trailing edge end;
   providing a flatback profile component;
   providing at least one web for connecting an inner surface of the lower shell part with an inner surface of the upper shell part;
   connecting the flatback profile component with the at least one web to form a flatback assembly;
   placing the flatback assembly on the lower shell part; and
   mounting the upper shell part on the lower shell part and on the flatback assembly,
   wherein the at least one web is connected with the flatback profile component and/or a further web by one or more bolts.

2. The method according to claim 1, wherein the flatback profile component comprises one or more flanges, wherein an adhesive is applied on the one or more flanges of the flatback profile component and wherein the flatback profile component is bonded to the trailing edge ends of the lower and upper shell parts.

3. The method according to claim 1, wherein the one or more bolts comprise one or more plastic bolts.

4. The method according to claim 1, wherein the flatback profile component has a varying geometry over its length.

5. The method according to claim 1, wherein the flatback profile component is provided with angled flanks, the angled flanks being bonded with the upper and lower shell parts.

6. The method according to claim 1, wherein the flatback assembly is lifted into the lower shell part when the lower shell part is arranged in a mould, and wherein the mould is closed in order to bond the upper shell part with the lower shell part.

7. The method according to claim 1, wherein the one or more bolts comprises at least two bolts, wherein said flatback profile component is connected with the at least one web by the at least two bolts, and wherein one of the at least two bolts is arranged above other ones of the at least two bolts.

8. The method according to claim 1, wherein in the flatback assembly, the at least one web is connected with at least one further web.

9. The method according to claim 8, wherein in the flatback assembly, the at least one web is connected with a leading edge web.

10. A wind turbine blade obtainable by a method according to claim 1, said wind turbine blade comprising:
- the upper shell part;
- the lower shell part;
- a leading edge and the trailing edge; and
- the flatback profile component being arranged at the trailing edge, wherein the flatback profile component is coupled by the one or more bolts with the at least one web, wherein the at least one web couples an interior surface of the upper shell part with an interior surface of the lower shell part.

11. The wind turbine blade according to claim 10, wherein the at least one web is embodied as an I-beam profile, wherein the I-beam profile is bonded by an adhesive to the interior surfaces of the shell parts.

12. The wind turbine blade according to claim 10, wherein the at least one web comprises a first web arranged in a trailing edge region and a second web arranged in a leading edge region, wherein the first web is coupled by the one or more bolts with the flatback profile component and wherein the first web is coupled with the second web by at least one further bolt.

13. The wind turbine blade according to claim 10, wherein the flatback profile component comprises a fibre reinforced laminate.

14. The wind turbine blade according to claim 10, wherein a side face of the at least one web is connected with the flatback profile component by the one or more bolts.

15. The wind turbine blade according to claim 14, wherein the side face of the at least one web is connected with the flatback profile component by the one or more bolts, the one or more bolts comprising one or more plastic bolts.

16. A flatback assembly for use in a wind turbine blade comprising a flatback profile component and at least one shear web, wherein the flatback profile component is connected with the at least one shear web to form the flatback assembly,
- wherein the flatback profile component is configured to be arranged at a trailing edge of the wind turbine blade,
- wherein the flatback profile component is configured to be coupled by at least one distance holder with the at least one shear web,
- wherein the at least one shear web is configured to couple an interior surface of an upper shell part of the wind turbine blade with an interior surface of a lower shell part of the wind turbine blade, and
- wherein the at least one shear web is connected with the flatback profile component and/or a further web by one or more bolts.

* * * * *